(12) United States Patent
Li et al.

(10) Patent No.: US 10,534,888 B2
(45) Date of Patent: Jan. 14, 2020

(54) HYBRID BACK END OF LINE METALLIZATION TO BALANCE PERFORMANCE AND RELIABILITY

(71) Applicant: International Business Machines Corporation, Armonk, NY (US)

(72) Inventors: Baozhen Li, South Burlington, VT (US); Chih-Chao Yang, Glenmont, NY (US); Theo Standaert, Clifton Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/860,885

(22) Filed: Jan. 3, 2018

(65) Prior Publication Data
US 2019/0205496 A1    Jul. 4, 2019

(51) Int. Cl.
*G06F 17/50*      (2006.01)
*G03F 1/70*       (2012.01)
(Continued)

(52) U.S. Cl.
CPC ............ *G06F 17/5077* (2013.01); *G03F 1/70* (2013.01); *G06F 17/5081* (2013.01); *G06F 2217/04* (2013.01); *G06F 2217/78* (2013.01); *G06F 2217/82* (2013.01); *H01L 23/528* (2013.01); *H01L 23/5226* (2013.01); *H01L 23/53209* (2013.01); *H01L 23/53228* (2013.01); *H01L 23/53242* (2013.01); *H01L 23/53257* (2013.01)

(58) Field of Classification Search
CPC ..... G06F 17/5077; G06F 17/5081; G03F 1/70
USPC .................................................... 716/51, 54
See application file for complete search history.

(56) References Cited

U.S. PATENT DOCUMENTS 6,025,731 A   2/2000   Hembree et al.
6,486,557 B1  11/2002  Davis et al.
(Continued)

OTHER PUBLICATIONS

Anonymous, "Hybrid Refractory Metal-Copper Wiring Metallization Scheme for Integrated Circuits", IP.com Prior Art Database Technical Disclosure, IPCOM000223293D, 4 pages (Nov. 15, 2012).

*Primary Examiner* — Stacy Whitmore
(74) *Attorney, Agent, or Firm* — Scully, Scott, Murphy & Presser, P.C.; Alvin Borromeo

(57) ABSTRACT

A computer implemented method, a system and a computer readable storage medium configured to conduct the following: determining a reliability parameter of an initial hybrid metallization to determine a determined reliability parameter, comparing the determined reliability parameter to a reliability limit and determining a reliability ratio, determining a performance parameter of the initial hybrid metallization to determine a determined performance parameter, comparing the determined performance parameter to a performance limit and determining a performance ratio, determining a reliability indice from the reliability ratio, determining a performance indice from the performance ratio, determining a reliability score from a combination of the determined reliability parameter and the reliability indice, determining a performance score from a combination of the determined performance parameter and the performance indice, comparing the reliability score to the performance score, selecting a first interconnect and forming the first interconnect on the mask.

16 Claims, 6 Drawing Sheets

(51) Int. Cl.
*H01L 23/00* (2006.01)
*H01L 23/532* (2006.01)
*H01L 23/522* (2006.01)
*H01L 23/528* (2006.01)

(56) References Cited

U.S. PATENT DOCUMENTS

| | | |
|---|---|---|
| 6,677,680 B2 | 1/2004 | Gates et al. |
| 7,442,637 B2 | 10/2008 | Su et al. |
| 7,750,472 B2 | 7/2010 | Kim et al. |
| 8,429,577 B2 | 4/2013 | Li et al. |
| 8,525,339 B2 | 9/2013 | Yang et al. |
| 8,923,600 B2 * | 12/2014 | Zafar ................ G03F 1/84 |
| | | 382/144 |
| 9,171,801 B2 | 10/2015 | Bao et al. |
| 9,209,126 B2 | 12/2015 | Lin et al. |
| 9,536,830 B2 | 1/2017 | Bao et al. |
| 9,859,277 B2 * | 1/2018 | Smayling ......... H01L 21/28518 |
| 2005/0245063 A1 | 11/2005 | Chinthakindi et al. |
| 2013/0082351 A1 | 4/2013 | Chen et al. |
| 2019/0121928 A1 * | 4/2019 | Wu ................ G06F 17/5059 |

\* cited by examiner

HYBRID BACK END OF LINE METALLIZATION TO BALANCE PERFORMANCE AND RELIABILITY

BACKGROUND

The present application relates to a metallization structure and a method of forming the same. More particularly, the present application relates to hybrid back end of line (BEOL) metallization that balances the need for more performance with the reduction in reliability that can result in structures of higher performance or vice versa.

As technology scales to smaller and smaller interconnects, resistance can increase rapidly. Much of the performance gain from device scaling can be negated by high resistance, which can be accompanied by a reduction in reliability due to electromigration (EM) (liner, cap, etc) and time dependent dielectric breakdown (TDDB) (spacing and process control).

Typically, EM and TDDB reliability act in an opposite direction as compared to a desired resistance and capacitance. This balance can be taken into account manually, by a designer, who makes specific metal line selections based on the predicted impact on performance and reliability. This process is not very efficient or effective.

Therefore, a method to automatically design a metallization structure is needed that can balance performance with reliability.

SUMMARY

In one aspect of the present application, a computer implemented method, a system and a computer readable storage medium are configured to conduct the following: determining a reliability parameter of an initial hybrid metallization to determine a determined reliability parameter, comparing the determined reliability parameter to a reliability limit and determining a reliability ratio, determining a performance parameter of the initial hybrid metallization to determine a determined performance parameter, comparing the determined performance parameter to a performance limit and determining a performance ratio, determining a reliability indice from the reliability ratio, determining a performance indice from the performance ratio, determining a reliability score from a combination of the determined reliability parameter and the reliability indice, determining a performance score from a combination of the determined performance parameter and the performance indice, comparing the reliability score to the performance score, selecting a first interconnect based on the comparison of the reliability score to the performance score and forming the first interconnect on the mask.

DETAILED DESCRIPTION

Figure 1:
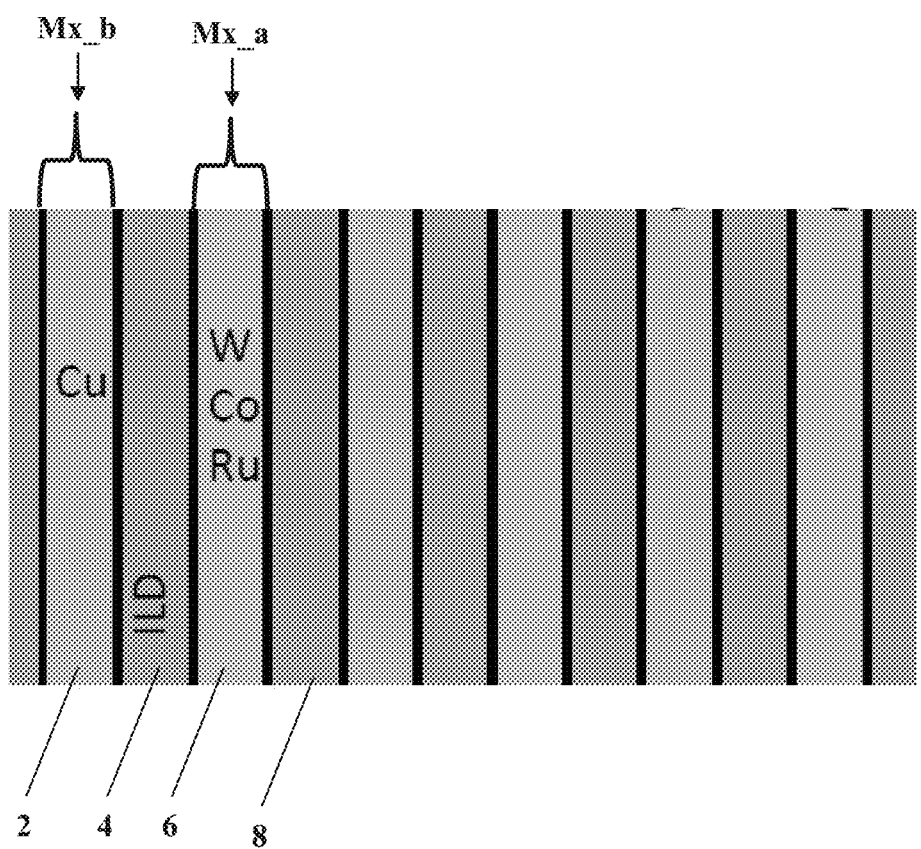
FIG. 1 is top view of a proposed hybrid metallization structure.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" "or adjacent" another element, it can be directly on the other element or intervening elements may also be present. In contrast, when an element is referred to as being "directly on" or "directly over" or "directly adjacent" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present. All dielectric constants mentioned herein are relative to a vacuum, unless otherwise noted.

In the discussion and claims herein, the term "about" indicates that the value listed may be somewhat altered, as long as the alteration does not result in nonconformance of the process or structure to the illustrated embodiment. For example, for some elements the term "about" can refer to a variation of ±0.1%, for other elements, the term "about" can refer to a variation of ±1% or ±10%, or any point therein.

As used herein, the term "substantially", or "substantial", is equally applicable when used in a negative connotation to refer to the complete or near complete lack of an action, characteristic, property, state, structure, item, or result. For example, a surface that is "substantially" flat would either be completely flat, or so nearly flat that the effect would be the same as if it were completely flat.

The present disclosure is directed to metal wiring design involving a metallization approach.

Referring now to FIG. 1, there is illustrated a design for a hybrid metallization, including: forming a copper wire 2 of a first width; forming an interlayer dielectric 4 (ILD) of a first ILD width adjacent or directly adjacent the copper wire; forming a transition metal wire 6, the transition metal wire being any suitable metal, such as but not limited to tungsten (W), cobalt (Co), ruthenium (Ru), Nickel (Ni), Copper (Cu), metal alloys or Cu covered with another metal cap, such as Cu—Al, Cu—Mn, Cu—Co, and combinations thereof, of a second width, the transition metal wire adjacent or directly adjacent the ILD, and forming another ILD 8 of a second ILD width adjacent or directly adjacent the transition metal wire. This process can be repeated, as seen in FIG. 1, with the addition of copper wire, ILD, transition metal wire, ILD, copper wire, etc. Although wire 2 is referred to as a copper wire, wire 2 can formed of any suitably conducting material, such as aluminum (Al), copper (Cu), metal alloys and Cu covered with another metal cap, such as Cu—Al, Cu—Mn, Cu—Co and combinations thereof. As another example, wire 2 can be any conductor that has better electrical conduction than the transition metal wire 6) Also, the hybrid metallization refers to one interconnect level of a semiconductor structure.

The inclusion of the ILD in this interconnect design is to provide a material having a lower diffusion mobility as compared to adjacent materials. The inclusion of the copper wire in this interconnect design is to provide a material with a higher electrical conductivity as compared to adjacent materials.

Figure 2:
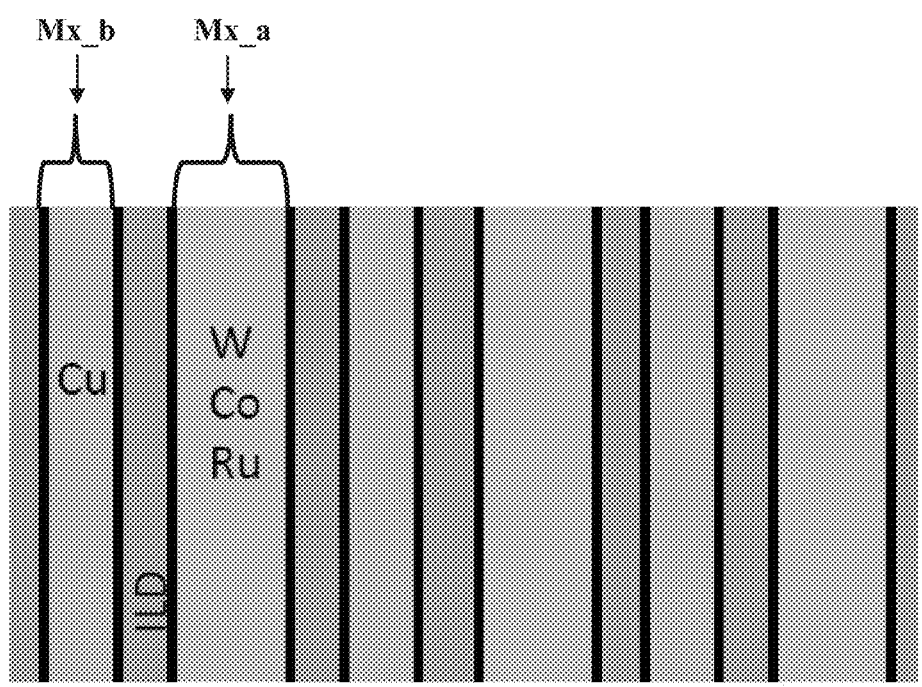
FIG. 2 is top view of a proposed hybrid metallization structure.

The first width of the copper wire 2 (referred to as Mx_b) and the second width of the transition metal wire 4 (referred to as Mx_a) are illustrated in FIGS. 1 and 2. In both Mx_b and Mx_a, the "x" is a place holder for a number, such as 1, 2, 3, etc. Thus, as illustrated in FIGS. 1 and 2, Mx_b can refer to M1_b with each successive copper wire being M2_b, M3_b, etc.

In FIG. 1, the Mx_a width and the Mx_b width are about the same, but in other embodiments, these two widths can be a different feature size. For example, the width of the transition metal wire 6 (Mx_a) can be wider as compared to the copper wire width (Mx_b), which is illustrated in FIG. 2. In FIG. 2, the transition metal wire 6 has a lower diffusion mobility and higher resistivity as compared to the transition metal wire 6 of FIG. 1.

Although not illustrated in FIG. 1 or 2, the metallizations may be formed on a semiconductor substrate, as a Back end of Line (BEOL) structure (with or without various layers in between), wherein the semiconductor substrate can include one or more semiconductor devices formed therein and/or thereupon. The semiconductor substrate may be composed of a semiconductor material having semiconducting properties such as, for example, Si, SiGe, SiGeC, SiC, Ge alloys, III/V compound semiconductors or II/VI compound semiconductors, may be used. In some embodiments, the semiconductor substrate may include a single semiconductor material. In other embodiments, the semiconductor substrate can be a layered semiconductor such as, for example, Si/SiGe, Si/SiC, silicon-on-insulators (SOIs) or silicon germanium-on-insulators (SGOIs).

The one or more semiconductor devices that can be present on and/or in the semiconductor substrate include, but are not limited to, field effect transistors, capacitors, and/or resistors. The one or more semiconductor devices can be formed utilizing well known FEOL processing techniques. So as not to obscure the present application, details concerning the FEOL processing that can be used in providing the one or more semiconductor devices are not provided herein.

In some embodiments, the substrate may also include a middle-of-the-line (MOL) dielectric material that laterally surrounds each semiconductor device. The MOL dielectric material may include one or more contact structures which contact various portions of some of the semiconductor devices. So as not to obscure the present application, details concerning the MOL dielectric material and the contact structure are not provided herein.

Figure 3:
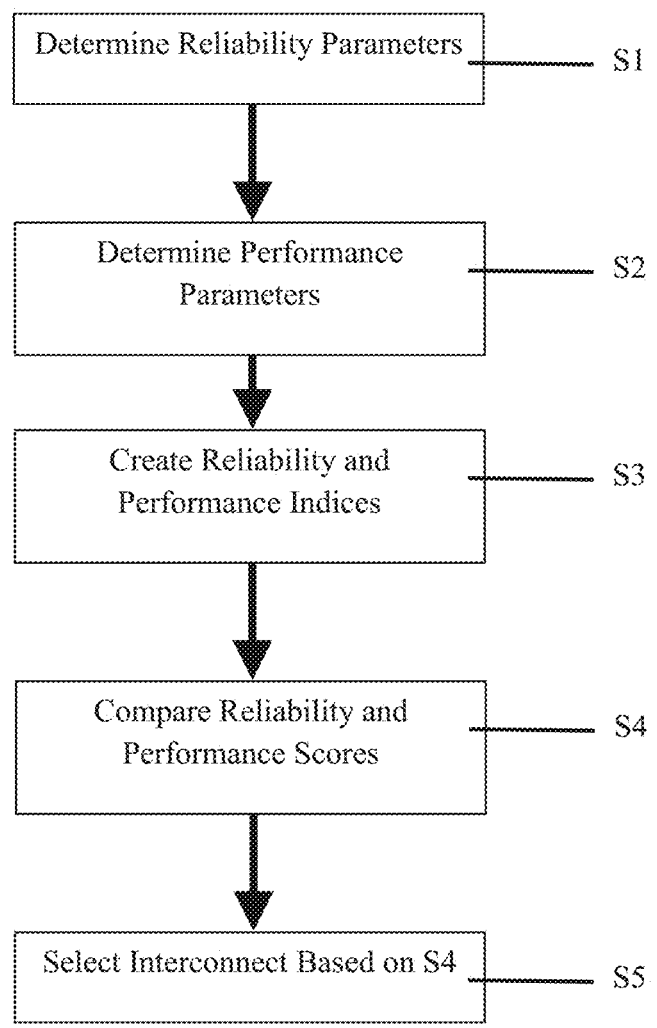
FIG. 3 is a flow chart of a method of forming a hybrid metallization structure.
Figure 6:
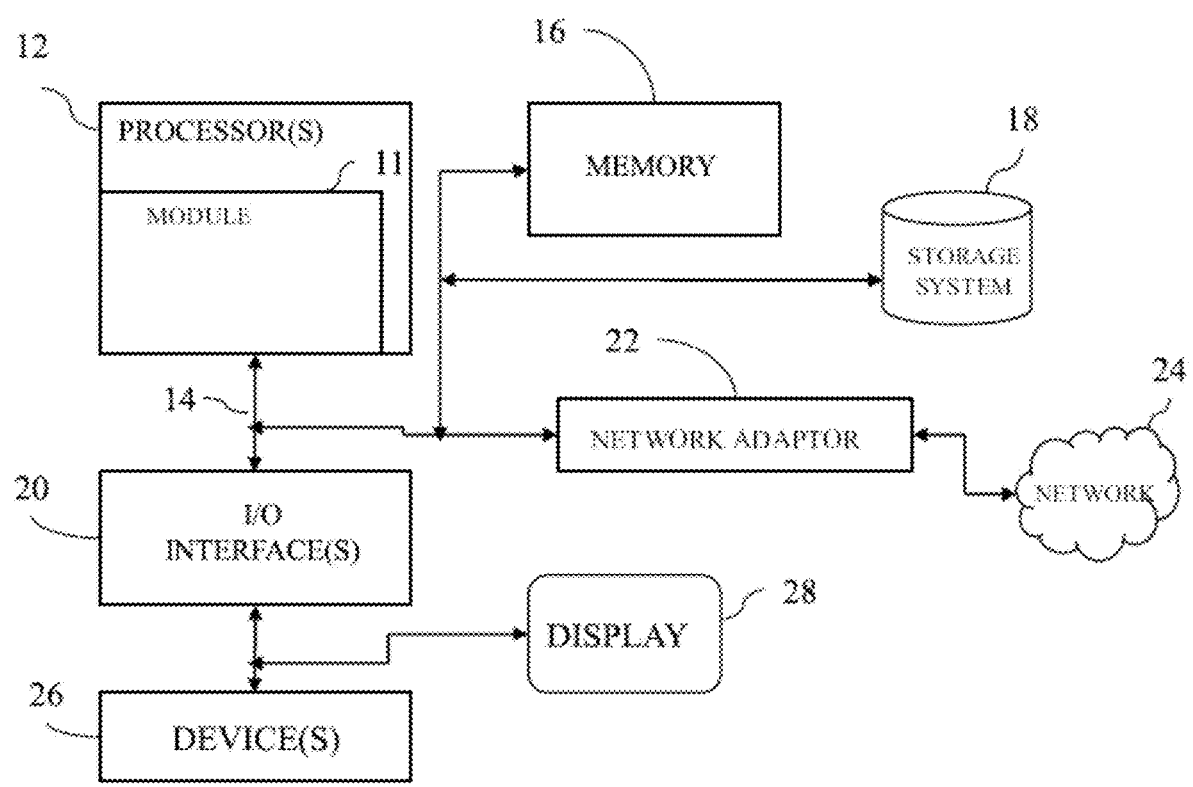
FIG. 6 illustrates a schematic of an example computer or processing system according to an embodiment of the present invention.

The determination of the design of an interconnect structure, such as those illustrated in FIGS. 1 and 2 is discussed below in reference to FIG. 3. In FIG. 3, a processor comprising hardware, can be configured to determine where to use a specific metallization for preparation of a mask based on a comparison between reliability and performance. This processor, along with any other processor discussed in this application can be a processor 12, as shown in FIG. 6 and discussed below.

Referring again to FIG. 3, initially, a processor comprising hardware is configured to review and/or design a suitable interconnect structure as an initial structure, for a specified use. Upon this initial structure, the processor is configured to extract reliability parameters for the structure in step S1, and is also configured to proceed through each step of the method illustrated in FIG. 3 successively to prepare a mask for the initial structure.

The initial structure can be created by a circuit designer based on general predicted reliability and performance standards, or can be a previously utilized design. For example, the circuit designer can include design parameters such as interconnect dimensions (conductor feature size vs. spacing in the dielectric) and conductor materials. Further, the circuit designer can include performance parameters, such as conductivity being more important than reliability (e.g. electromigration, time dependent dielectric break down, stress migration) or conductivity being less important than reliability.

In S1 the reliability parameters of the initial structure are extracted from the structure. These reliability parameters can include, but are not limited to, maximum current ($I_{max}$), maximum Voltage ($V_{max}$), etc., and combinations thereof. These values can be compared to technological limits for interconnects to create a ratio of the value extracted from the structure and the technological limits.

In S2, the performance parameters of the initial structure are extracted from the structure. These performance parameters can be based on, for example, operating frequency, power and allowance of resistance caused voltage drop (IR), to derive ideal resistance (R) and capacitance (C) for the initial interconnect structure. These performance parameters can then be compared to values of other previously designed interconnects.

In step S3, a reliability indice based on the extracted reliability parameters and a performance indice are created so that the parameters of S1 and S2 can be compared to each other. For example, for an M1 wire, the extracted reliability indice is determined as 0.4× of M1_a limit and 1.8× of M1_b limit.

One example of how this reliability indice can be determined is based on the current needed to carry for that wire vs the maximum current allowed to that metallization by the technology. For instance, if a given wire M1_a needs to carry 0.1 mA of current, and the maximum current allowed for M1_a is 0.25 mA, and for M1_b is 0.055 mA. The reliability indice can be assigned as 0.4 (which is 0.1 mA divided by 0.25 mA) and 1.8 (which is 0.1 mA divided by 0.055 mA) for these two options.

In step S4, a reliability score is decided, and is compared to a performance score. The reliability score is based on the extracted reliability parameters of S1 and the reliability indice of S3. The performance score is based on the extracted performance parameter of S2 and the performance indice of S3. Further to the example above (the extracted reliability indice is determined as 0.4× of M1_a limit and 1.8× of M1_b limit) the reliability score can be assigned as 100 for M1_a and 20 for M1_b. The difference between M1_a and M1_b being both a difference in material and a difference in width. The performance score can be assigned as 20 for M1_a and 60 for M1_b.

One example of how this performance indice can be determined is based on electrical resistance modeling from the device performance, such as PPG (performance per gate) or RO (ring oscillators). For instance, if the performance needs this wire resistance <20 Ohm, and if M1_a resistance is 19 Ohm and M1_b resistance is 12 Ohms, the performance indice can be assigned as 1.9 (which is 20*(1−(20−19)/20)) and 1.2 respectively (which is 20*(1−(20−12)/20)).

Based on the chip application, preference (or bias) may be given to reliability or performance. Also, an adjustment factor (>1 or <1) can be used to modify the above indices to reflect this preference (bias).

The processor is configured to compare the reliability score to the performance score and choose which score is more advantageous for the M1 wire of the mask. For example, if the reliability score is just higher than the performance score, the next interconnect line can be selected as a transitional metal line of a specified width in step S5.

In other embodiments, the processor can be set to choose the reliability score if it is a certain percentage higher than the performance score upon comparison. For example, if the reliability score is at least about 10% greater (and not less than about 10%) than the performance score, the next interconnect line can be chosen based on the reliability score. This percentage can be set as desired, such as about 5%, about 15%, about 20%, about 25%, about 30%, etc. and can apply to a comparison of the performance score to the reliability score, and vice versa—a comparison of the reliability score to the performance score. Based on the selected score, the processor can be configured to select the next interconnect in step S5.

Further to the example mentioned above, the reliability score being assigned as 100 for M1_a and 20 for M1_b and the performance score being assigned as 20 for M1_a and 60 for M1_b, the processor can select, in this embodiment, the highest score for M1_a ((100 vs. 20) which is an interconnect having a higher reliability than another interconnect). For the next interconnect, in this embodiment, the processor can select the highest score for M1_b ((20 vs. 60) which is an interconnect having a higher performance than another interconnect).

The processor can repetitively continue the process illustrated in FIG. 3 for each successive wire of the mask to form a full, simulated mask for the initial structure. For each successive wire, the same or different judgments can be made based on the desired performance and reliability of the line, as well as the desired performance and reliability of the entire mask itself.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 4:
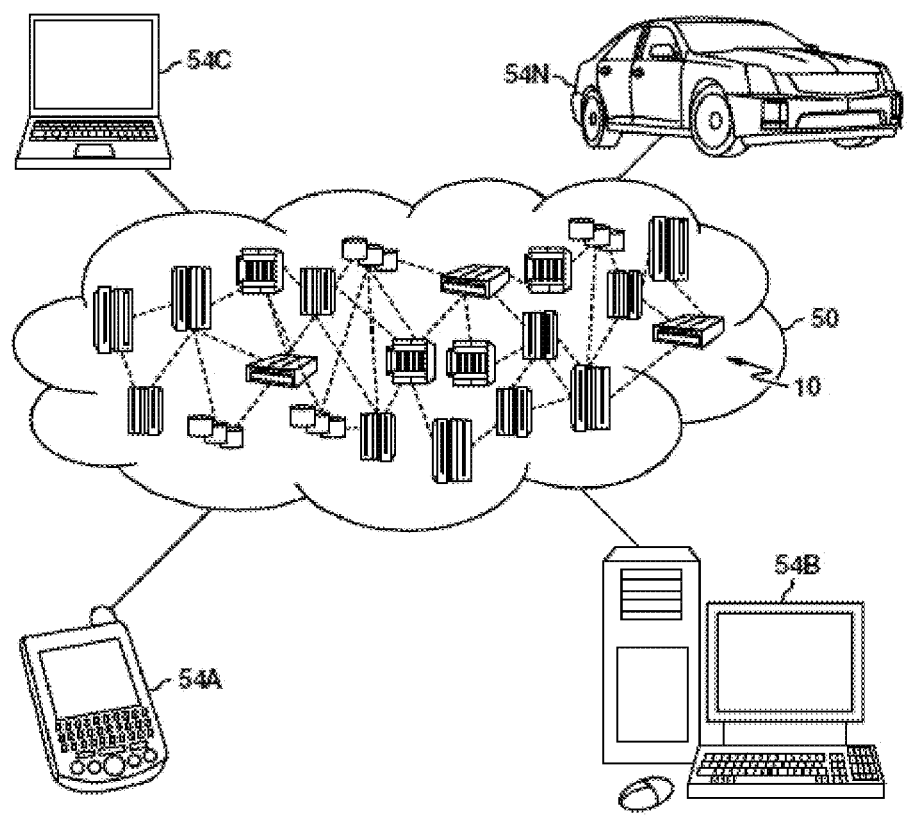
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
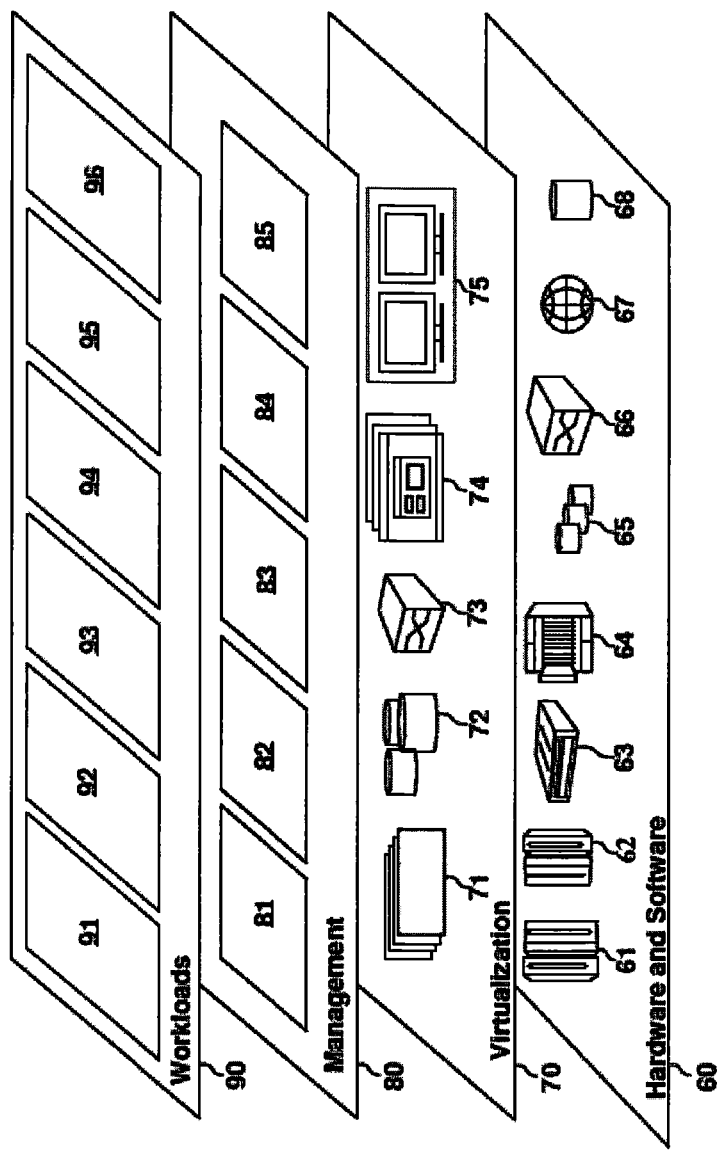
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators.

Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and activating geofences 96.

FIG. 6 illustrates a schematic of an example computer or processing system according to an embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 11 that performs the methods described herein. The module 11 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for generating a mask comprising the steps of:
    determining a reliability parameter of an initial hybrid metallization to determine a determined reliability parameter;
    comparing the determined reliability parameter to a reliability limit and determining a reliability ratio;
    determining a performance parameter of the initial hybrid metallization to determine a determined performance parameter;
    comparing the determined performance parameter to a performance limit and determining a performance ratio;
    determining a reliability indice from the reliability ratio;
    determining a performance indice from the performance ratio;
    determining a reliability score from a combination of the determined reliability parameter and the reliability indice;
    determining a performance score from a combination of the determined performance parameter and the performance indice;
    comparing the reliability score to the performance score;
    selecting a first interconnect based on the comparison of the reliability score to the performance score; and
    forming the first interconnect on the mask.

2. The computer implemented method of claim 1, wherein the reliability parameter is selected from the group consisting of maximum current, maximum voltage and combinations thereof.

3. The computer implemented method of claim 1, wherein the performance parameter is selected from the group consisting of operation frequency, power, allowance of resistance caused voltage drop (IR) and combinations thereof.

4. The computer implemented method of claim 1, wherein the selecting step is based on one of the reliability score and the performance score being higher than the other of the reliability score and the performance score.

5. The computer implemented method of claim 1, wherein the selecting step is based on one of the reliability score and the performance score being at least about 10% higher than the other of the reliability score and the performance score.

6. The computer implemented method of claim 1, wherein software is provided as a service in a cloud environment.

7. A system for generating a mask, comprising:
    one or more storage devices;
    one or more hardware processors coupled to the one or more storage devices;
    one or more hardware processors operable to determine a reliability parameter of an initial hybrid metallization to determine a determined reliability parameter;
    one or more hardware processors operable to compare the determined reliability parameter to a reliability limit and determining a reliability ratio;
    one or more hardware processors operable to determine a performance parameter of the initial hybrid metallization to determine a determined performance parameter;
    one or more hardware processors operable to compare the determined performance parameter to a performance limit and determining a performance ratio;
    one or more hardware processors operable to determine a reliability indice from the reliability ratio;
    one or more hardware processors operable to determine a performance indice from the performance ratio;

one or more hardware processors operable to determine a reliability score from a combination of the determined reliability parameter and the reliability indice;

one or more hardware processors operable to determine a performance score from a combination of the determined performance parameter and the performance indice;

one or more hardware processors operable to compare the reliability score to the performance score;

one or more hardware processors operable to select a first interconnect based on the comparison of the reliability score to the performance score; and forming the first interconnect on the mask.

8. The system of claim 7, wherein the reliability parameter is selected from the group consisting of maximum current, maximum voltage and combinations thereof.

9. The system of claim 7, wherein the performance parameter is selected from the group consisting of operation frequency, power, allowance of resistance caused voltage drop (IR) and combinations thereof.

10. The system of claim 7, wherein the processor configured to select selects based on one of the reliability score and the performance score being higher than the other of the reliability score and the performance score.

11. The system of claim 7, wherein the processor configured to select selects based on one of the reliability score and the performance score being at least about 10% higher than the other of the reliability score and the performance score.

12. A computer readable storage medium storing a program of instructions executable by a machine to perform a method for generating a mask, the method comprising:

determining a reliability parameter of an initial hybrid metallization to determine a determined reliability parameter;

comparing the determined reliability parameter to a reliability limit and determining a reliability ratio;

determining a performance parameter of the initial hybrid metallization to determine a determined performance parameter;

comparing the determined performance parameter to a performance limit and determining a performance ratio;

determining a reliability indice from the reliability ratio;

determining a performance indice from the performance ratio;

determining a reliability score from a combination of the determined reliability parameter and the reliability indice;

determining a performance score from a combination of the determined performance parameter and the performance indice;

comparing the reliability score to the performance score;

selecting a first interconnect based on the comparison of the reliability score to the performance score; and forming the first interconnect on the mask.

13. The computer readable storage medium of claim 12, wherein the reliability parameter is selected from the group consisting of maximum current, maximum voltage and combinations thereof.

14. The computer readable storage medium of claim 12, wherein the performance parameter is selected from the group consisting of operation frequency, power, allowance of resistance induced voltage drop (IR) and combinations thereof.

15. The computer readable storage medium of claim 12, wherein the selecting step is based on one of the reliability score and the performance score being higher than the other of the reliability score and the performance score.

16. The computer readable storage medium of claim 12, wherein the selecting step is based on one of the reliability score and the performance score being at least about 10% higher than the other of the reliability score and the performance score.

* * * * *